United States Patent
Ko et al.

(10) Patent No.: US 6,714,502 B2
(45) Date of Patent: Mar. 30, 2004

(54) METHOD OF VERIFYING DEFECT MANAGEMENT AREA INFORMATION OF OPTICAL DISC AND APPARATUS FOR PERFORMING THE SAME

(75) Inventors: Jung-wan Ko, Yongin (KR); Hyun-kwon Chung, Kyungki (KR)

(73) Assignee: Samsung Electronics Co., Ltd, Suwon (KR)

( * ) Notice: Subject to any disclaimer, the term of this patent is extended or adjusted under 35 U.S.C. 154(b) by 355 days.

(21) Appl. No.: 09/805,444

(22) Filed: Mar. 14, 2001

(65) Prior Publication Data

US 2001/0033538 A1 Oct. 25, 2001

Related U.S. Application Data

(60) Provisional application No. 60/195,473, filed on Apr. 10, 2000.

(30) Foreign Application Priority Data

Apr. 8, 2000 (KR) .............................................. 00-18500

(51) Int. Cl.[7] .................................................. G11B 27/36
(52) U.S. Cl. .................................. 369/53.35; 369/53.15
(58) Field of Search ................................ 369/53.1, 53.12, 369/53.15, 53.17, 53.35, 53.42

(56) References Cited

U.S. PATENT DOCUMENTS 5,303,219 A * 4/1994 Kulakowski et al. ......... 369/54

OTHER PUBLICATIONS

U.S. patent application Ser. No. 09/805,443, Ko et al., filed Mar. 14, 2001.
U.S. patent application Ser. No. 09/805,437, Ko et al., filed Mar. 14, 2001.
U.S. patent application Ser. No. 09/805,436, Ko et al., filed Mar. 14, 2001.
U.S. patent application Ser. No. 09/805,446, Ko et al., filed Mar. 14, 2001.
U.S. patent application Ser. No. 09/805,447, Ko et al., filed Mar. 14, 2001.
U.S. patent application Ser. No. 09/805,439, Ko et al., filed Mar. 14, 2001.
U.S. patent application Ser. No. 09/805,438, Ko et al., filed Mar. 14, 2001.
U.S. patent application Ser. No. 09/805,448, Ko et al., filed Mar. 14, 2001.

* cited by examiner

Primary Examiner—Nabil Hindi
(74) Attorney, Agent, or Firm—Staas & Halsey, LLP (57) ABSTRACT

A method of verifying the defect management area (DMA) information of a recordable and reproducible optical disc, and a test apparatus for performing the same. The method of verifying the DMA information includes selecting one among a plurality of test modes for verifying DMA information, setting a test reference according to the selected mode, generating test information from the DMA information, which is generated or updated by a recording and reproducing apparatus to be tested, according to the verification test mode, and executing the test for verifying the test information using the test reference in the selected mode. Accordingly, it is easily verified that a recording and reproducing apparatus properly translates and processes defect information, by using a different test disc, which is made using a mirror file with pre-fixed defect information which is not related to actual defects on a disc, depending on the DMA information verification test modes.

106 Claims, 4 Drawing Sheets

METHOD OF VERIFYING DEFECT MANAGEMENT AREA INFORMATION OF OPTICAL DISC AND APPARATUS FOR PERFORMING THE SAME

CROSS-REFERENCE TO RELATED APPLICATIONS

This application claims the benefit of Korean Application No. 00-18500, filed Apr. 8, 2000, in the Korean Patent Office and U.S. Provisional Application No. 60/195,473, filed Apr. 10, 2000 in the U.S. Patent & Trademark Office, the disclosures of which are incorporated herein by reference.

BACKGROUND OF THE INVENTION

1. Field of the Invention

The present invention relates to optical disc recording and reproducing technology, and more particularly, to a method of verifying the defect management area information of a recordable and reproducible optical disc, and a test apparatus for performing the same.

2. Description of the Related Art

Digital versatile disc-random access memory (DVD-RAM) discs have a defect management function of replacing defective areas with normal recordable areas and storing information necessary for the defect management in a portion referred to as a defect management area (DMA) thereon. DMA information is repeatedly recorded in four portions on a disc: two portions in a lead-in area and two portions in a lead-out area. DMA information is composed of a disc definition structure (DDS), a primary defect list (PDL) and a secondary defect list (SDL). DMA information includes information on a spare area and important information on the start logical sector number of each zone, in addition to information on defects, which are detected during certification performed while a disc is being initialized or during use of a disc.

Some information included in the DMA can be immediately read and used. On the other hand, the DMA includes information which varies with the positions and the number of defects on a disc. That is, some information, for example, the position information of the start logical sector number of each zone or the position information of a first logical sector number, can be obtained only by performing complex computation according to a given algorithm based on defect information registered in the DMA.

Since such DMA information is closely related to a physical data recording position, a recording medium such as an optical disc, which can be used in a given recording and reproducing apparatus even if DMA information on the disc has been generated or updated in another recording and reproducing apparatus, may have a compatibility problem between the recording and reproducing apparatuses when the DMA information is wrong. To overcome this problem, an apparatus and method of verifying that a recording and reproducing apparatus correctly reads DMA information from a disc and correctly records DMA information on the disc is desired.

SUMMARY OF THE INVENTION

To solve the above problem, a first object of the present invention is to provide a method of verifying that defect management area (DMA) information on a disc is correctly generated and updated in an optical disc recording and reproducing apparatus which detects defects on the disc and records information on the defects in a DMA.

A second object of the present invention is to provide a method of verifying that defect management area (DMA) information on a disc is correctly generated and updated in a recording and reproducing apparatus for repeatedly recordable and reproducible DVD-RAM discs, which detects defects on the disc and records information on the defects in a DMA.

A third object of the present invention is to provide a method of verifying that an optical recording and reproducing apparatus always reads and processes defect information properly, under the same conditions without being influenced by an actual state of a disc having defect information, using a test disc containing predetermined defect information which does not have any relation with actual defects.

A fourth object of the present invention is to provide a test apparatus for verifying that defect management area (DMA) information on a disc is correctly generated and updated in an optical disc recording and reproducing apparatus which detects defects on the disc and records information on the defects in a DMA.

A fifth object of the present invention is to provide an apparatus for testing an optical recording and reproducing apparatus to verify that it always reads and processes defect information properly, under the same conditions without being influenced by an actual state of a disc having defect information, using a test disc containing predetermined defect information which does not have any relation with actual defects.

Additional objects and advantages of the invention will be set forth in part in the description which follows and, in part, will be obvious from the description, or may be learned by practice of the invention.

To achieve the above and other objects of the invention, there is provided a method of verifying that DMA information is properly generated or updated in a recording and reproducing apparatus which records or reproduces information on or from an optical disc with DMA information. The method includes selecting one among a plurality of test modes for verifying the DMA information and setting a test reference according to the selected mode, generating test information from the DMA information, which is generated or updated by the recording and reproducing apparatus to be tested, according to the verification test mode, and executing the test for verifying the test information using the test reference in the selected mode.

To achieve the above and other objects of the invention, there is also provided an apparatus for testing a recording and reproducing apparatus which records or reproduces information on or from a recording and reproducing optical disc with DMA information to check whether the DMA information is properly generated or updated. The apparatus includes a modified drive which generates test information from the generated/updated DMA information of a test disc, which is obtained after the recording and reproducing apparatus processes the test disc with a DMA mirror file corresponding to a selected mode among a plurality of DMA information verification test modes for verifying the DMA information in the selected mode; and a verifier which compares the test information with predetermined test information of the selected mode to verify the test result.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE PREFERRED EMBODIMENTS

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

An optical disc used in the present invention is a phase change recording DVD-RAM having a capacity of 4.7 gigabytes (GB). DVD-RAM discs are defined in the DVD specification for rewritable disc version 2.0.

Figure 1:
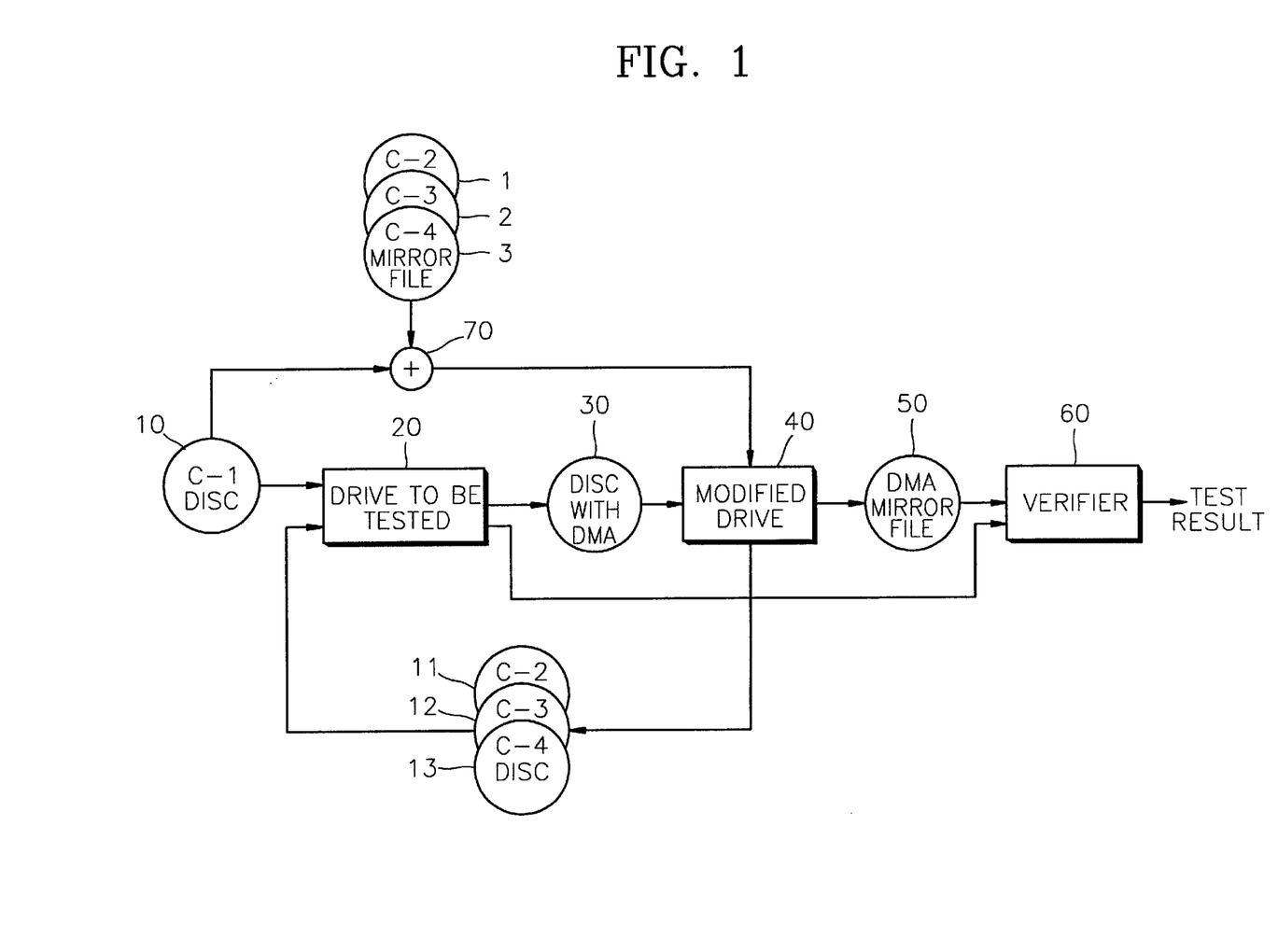
FIG. 1 shows an embodiment of a test apparatus for performing a method of verifying defect management area (DMA) information of an optical disc according to the present invention.

FIG. 1 is a block diagram of a test apparatus for performing a method of verifying the defect management area (DMA) information of an optical disc according to the present invention.

A first test type disc (hereinafter referred to as a C-1 disc) 10 is obtained by making known physical defects at predetermined positions on a blank disc. A drive to be tested 20 performs initialization with certification or initialization without certification on the C-1 disc 10 to generate DMA information and records the generated DMA information on the C-1 disc 10. A disc with DMA 30 is withdrawn from the drive to be tested 20 and loaded into a modified drive 40, which is capable of reading DMA information.

The modified drive 40 is manufactured to be used exclusively for a test and may be referred to as a reference drive. The modified drive 40 reads only the DMA information from the disc with DMA 30 and generates a DMA mirror file 50 of the read DMA information in a file system. The drive to be tested 20 is realized as, for example, a DVD-RAM recording and reproducing apparatus, and is not designed to generate a mirror file of the DMA information.

When the recording and reproducing architecture of the DVD-RAM recording and reproducing apparatus 20 is divided into a file layer, a host interface layer for interfacing a host computer with the recording and reproducing apparatus, a physical drive layer for recording and reproducing physical signals, and a recording medium layer, since physical sector numbers of a disc are assigned by a recording medium and a physical drive, and logical sector numbers of a disc are assigned by a host interface and a file system, writing and reading of DMA information is performed in the physical drive layer and the layers therebelow.

Generally, when data is recorded on a recording medium in a computer, a recording start position is determined based on a logical sector number assigned by a file system. The file position indicated by a logical sector number is logical and relative position information. When a recording operation is performed in a drive, the logical sector number needs to be converted into a physical sector number indicating a position at which data is actually recorded on a disc taking into account the physical state such as the state of defects of the disc. However, when user data is actually recorded by the file system, the user data is transmitted to a recording and reproducing apparatus using only the logical sector number, and the recording and reproducing apparatus converts the logical sector number into the physical sector number, which indicates a position at which the data is actually recorded, using defect management information. Accordingly, when defect management information contained on a disc has erroneously been read and written in a recording and reproducing apparatus, data cannot be exactly read from or written to the disc in another recording and reproducing apparatus.

Moreover, in the case of a DVD-RAM disc, every defect management process is supposed to be performed by a drive so that the file system or the host interface can record or reproduce a file without using information related to a completed physical defect management process. Accordingly, most of the drives are not provided with a function of recording or reproducing information in or from a DMA, and moreover, are not provided with a standard command for recording or reproducing information in or from the DMA. However, an environment must be prepared in any way such that data can be read by a computer, which can analyze DMA information, to determine whether the DMA information is properly formed, and correct information must be able to be recorded in a corresponding DMA to make a standard test disc. In order to effectively perform such operations, a modified drive for recording or reproducing information in or from the DMA is provided. This modified drive can be easily designed or obtained by those skilled in the art, and thus a description thereof will be omitted.

A verifier 60 compares the DMA mirror file 50 for the C-1 disc 10, which is generated by the modified drive 40 from the disc with DMA 30 generated by the drive to be tested 20, with a reference DMA mirror file for the C-1 disc 10 in application, and informs the manufacturer or user of the result of performing this test to check whether DMA information is properly generated after initialization. The reference DMA mirror file is stored in advance or is provided from the outside (a controller for generating a DMA mirror file) although not shown. The DMA mirror file can be referred to as test information, and the reference DMA mirror file can be referred to as predetermined test information.

The verifier 60 stores therein or is provided with from the outside, a reference DMA mirror file for a second test type disc (referred to as a C-2 disc) 11, a reference DMA mirror file for a third test type disc (referred to as a C-3 disc) 12 and a reference DMA mirror file for a fourth test type disc (referred to as a C-4 disc) 13 in addition to the reference DMA mirror file for the C-1 disc 10.

An adder 70 adds the reference DMA mirror file 1 for the C-2 disc on the C-1 disc 10 and provides the result to the modified drive 40. Then, the modified drive 40 produces the C-2 disc 11. The adder 70 is provided outside the modified drive 40 for clear understanding of the present invention, but actually it is preferable to provide the adder 70 within the modified drive 40. In other words, the reference DMA mirror file for the C-2 disc 11 is recorded on the C-1 disc 10 using the modified drive 40.

The reference DMA mirror file 1 for the C-2 disc 11 has DMA with pre-fixed contents regardless of the state of defects of a disc on which a C-2 mirror file is recorded, and a supplementary spare area (SSA) is not full.

When loaded with the C-2 disc 11, the drive to be tested 20 enters one of three reinitialization modes, i.e., reinitialization with certification, reinitialization with secondary defect list (SDL) conversion, or reinitialization with clearing G2 list and SDL, to generate or update DMA information, and provides the disc 30 with DMA information that has been generated or updated in the reinitialization mode. When loaded with the disc 30 with the DMA information, which is generated or updated by initialization, the modified drive 40 reads only the DMA information and generates a mirror file 50 thereof. The DMA mirror file 50 is provided to the verifier 60.

In the reinitialization with certification, a disc is initialized such that only a P list is maintained, and an old G1 list, an old G2 list and an SDL are disposed. During this reinitialization, defects of all sectors, which are detected by certification, are registered in a new G1 list. A new G2 list and a new SDL are in a null state. When the new G1 list overflows with the defects of the sectors, the remaining defects that cannot be registered in the new G1 list can be registered in the new SDL.

Here, a list of defective sectors, which are detected by the test performed by a manufacturer in a factory, is referred to as a P list. A list of defective sectors, which are detected during user certification, is referred to as a G1 list. A list, which is obtained by converting an old SDL during reinitialization, is referred to as a G2 list. Each of the P list, the G1 list and the G2 list falls under a primary defect list (PDL).

In the reinitialization with SDL list conversion, the SDL entries, which are processed according to a linear replacement algorithm, are erased and replaced with PDL entries (i.e., the G2 list) that are obtained by processing 16 reassigned sectors, which are included in a defective block, among the SDL entries according to a slipping replacement algorithm. The new SDL is in a null state. However, the P list and the old G1 list are maintained, and the entries of the old G2 list and the entries of the SDL are registered in the new G2 list.

The reinitialization including the clearing of the G2 list and SDL is to initialize a disc only using the P list while using the disc, or to return to the latest certified state by removing the sectors that are reassigned for linear replacement. In this reinitialization, the SDL and the G2 list in the PDL are disposed, and the updated PDL includes the P list and the G1 list. These three reinitialization modes are defined in the DVD specification for Rewritable disc version 2.0.

Accordingly, the C-2 disc 11 for reinitialization testing preferably includes all the types of defects, i.e., P, G1 and G2. Particularly, sufficient SDL entries are required for testing list conversion. In other words, it is preferable that the C-2 disc 11 has sufficient PDL entries to result in overflow after the list conversion to test an overflow state during the list conversion. For example, when old PDL entries are represented by m, and old SDL entries are represented by n, since the maximum number of entries of a new PDL, which is obtained after the SDL list is converted into a G2 list by reinitialization, is limited to 7679, a number n of SDL entries, which satisfies the condition of m+n*16>7679, are preferably prepared before reinitialization to test the overflow state of the list conversion.

In addition, defects are located to be concentrated before and after a position, which is most proper to determine whether the positions of a start logical sector number and a first logical sector number, which are determined depending on the positions and the number of defects on the C-2 disc 11, are exact, for example, a position corresponding to a logical sector number 0. Alternatively, defects are disposed on the C-2 disc 11 such that the start and last sectors of each zone are processed as defects to increase the test effect.

The verifier 60 compares the DMA mirror file 50 for the C-2 disc 11 with the reference DMA mirror file for the C-2 disc 11 in application and informs the manufacturer or the user of the test result indicating whether the DMA information generated during the reinitialization mode is correctly generated or updated.

The adder 70 adds the reference DMA mirror file 2 for the C-3 disc 12 on the C-1 disc 10 and provides the result to the modified drive 40. Then, the modified drive 40 produces the C-3 disc 12. The reference DMA mirror file 2 for the C-3 disc 12 has DMA with pre-fixed contents regardless of the actual state of physical defects of a disc on which a C-3 mirror file is recorded, and a supplementary spare area (SSA) includes sufficient SDL defects to be full.

When loaded with the C-3 disc 12, the drive to be tested 20 tests for whether the state, in which the SSA of the corresponding disc is full, is exactly determined, and informs the user. In addition, the drive to be tested 20 expands the SSA, which is in full condition, and thus the C-3 disc 12 becomes the disc 30 with DMA information which is updated according to the expansion of the SSA. When loaded with the disc 30 with the DMA information updated according to the expansion of the SSA, the modified drive 40 reads only the DMA information to generate a mirror file and provides the DMA mirror file 50 to the verifier 60.

In the state in which the SSA is full, information on the expansion of the SSA is not embedded, but only information for determining the size and position of the SSA is changed. After the expansion of the SSA, information is converted to indicate that the SSA is not full. Accordingly, if reference information does not exist, it is difficult to determine whether a relevant drive normally expands the SSA. Therefore, it is preferable to use a reference DMA mirror file.

When spare area full flags, one for a primary spare area and the other for the SSA, which are embedded in the SDL of a reference DMA mirror file provided as such reference information, is recorded to correspond to the state in which the SSA is full, the spare area full flags can be set to allow checking that, after the expansion of the SSA, the spare area full flag for the primary spare area is maintained, and the spare area full flag for the SSA is converted to indicate the state that the SSA is not full.

Additionally, a spare area for defect management on a disc is divided into a primary spare area, a secondary spare area and an SSA. The primary spare area, which is first assigned when a disc is initialized for replacement of defects, is primarily used for slipping replacement. The remaining spare area can be used as the secondary spare area for linear replacement. The secondary spare area, which is used for linearly replacing defects occurring while a disc is in use, is defined as a spare area which remains after the primary spare area is used for slipping replacement during the initialization. Alternatively, the secondary spare area may be separately assigned. The SSA is used for linearly replacing defects occurring while the disc is in use. The SSA is additionally assigned while the disc is in use after the initialization.

When a spare area for linear replacement is lacking during the use of a disc after initialization, an SSA for linear replacement is assigned in such a manner that the SSA is gradually increased by a predetermined size in a reverse direction starting from the end of a logical volume area in a file system. The SSA is also used in the reverse direction starting from the end of the logical volume area during linear replacement.

The verifier 60 compares the DMA mirror file 50 for the C-3 disc with the reference DMA mirror file for the C-3 disc in application and informs the manufacturer or the user of the result of testing of the proper extension of the SSA. Since the SSA is reversely assigned starting from the end of the logical volume area of the file system, when the test is performed using the C-3 disc, a file system verifier, although not shown, is preferably used for checking whether the assignment of the SSA complies with a file system of a prescribed standard.

The adder 70 adds the reference DMA mirror file 3 for the C-4 disc on the C-1 disc 10 and provides the result to the modified drive 40. Then, the modified drive 40 produces the C-4 disc 13. The reference DMA mirror file 3 for the C-4 disc 13 has DMA with pre-fixed contents regardless of the defect state of a disc on which a C-4 mirror file is recorded, and a wrong start logical sector number of each zone is recorded on purpose.

When loaded with the C-4 disc 13, the drive to be tested 20 performs recording and directly provides the result of the recording to the verifier 60, without loading the disc with DMA 30 on the modified drive 40 to allow the generation of the DMA mirror file 50. The drive to be tested 20 must be able to detect wrong start logical sector numbers, read data based on the previously stored DMA information, and must not write any user data to a disc.

If the wrong start logical sector number of each zone is written to a disc, it is determined that a recording state that the previous drive determined to be right is wrong. In this case, since the previous drive recorded data based on the wrong logical sector number information written to the DMA, previously recorded data can be seriously damaged when new data is recorded on the disc or when the previously recorded data is updated. Moreover, it is preferable to read the previously recorded data based on a system of calculation used by the previous drive.

It is preferable that a recording operation of the DMA information on a disc is not performed when the disc, to which the wrong start logical sector number of each zone is written, is loaded into the drive to be tested 20, even if a user starts the operation. Accordingly, if the drive to be tested 20 does not perform the recording operation even if the user starts the recording operation to write data to the C-4 disc 13, the verifier 60 informs the user that the drive to be tested 20 operates normally. If not so, the verifier 60 informs the user that the drive to be tested 20 does not operate normally.

Such a test of a disc, to which a wrong start logical sector number is written, can be performed by an engineer's manual operation and a determination of whether the drive to be tested 20 operates normally.

Figure 2:
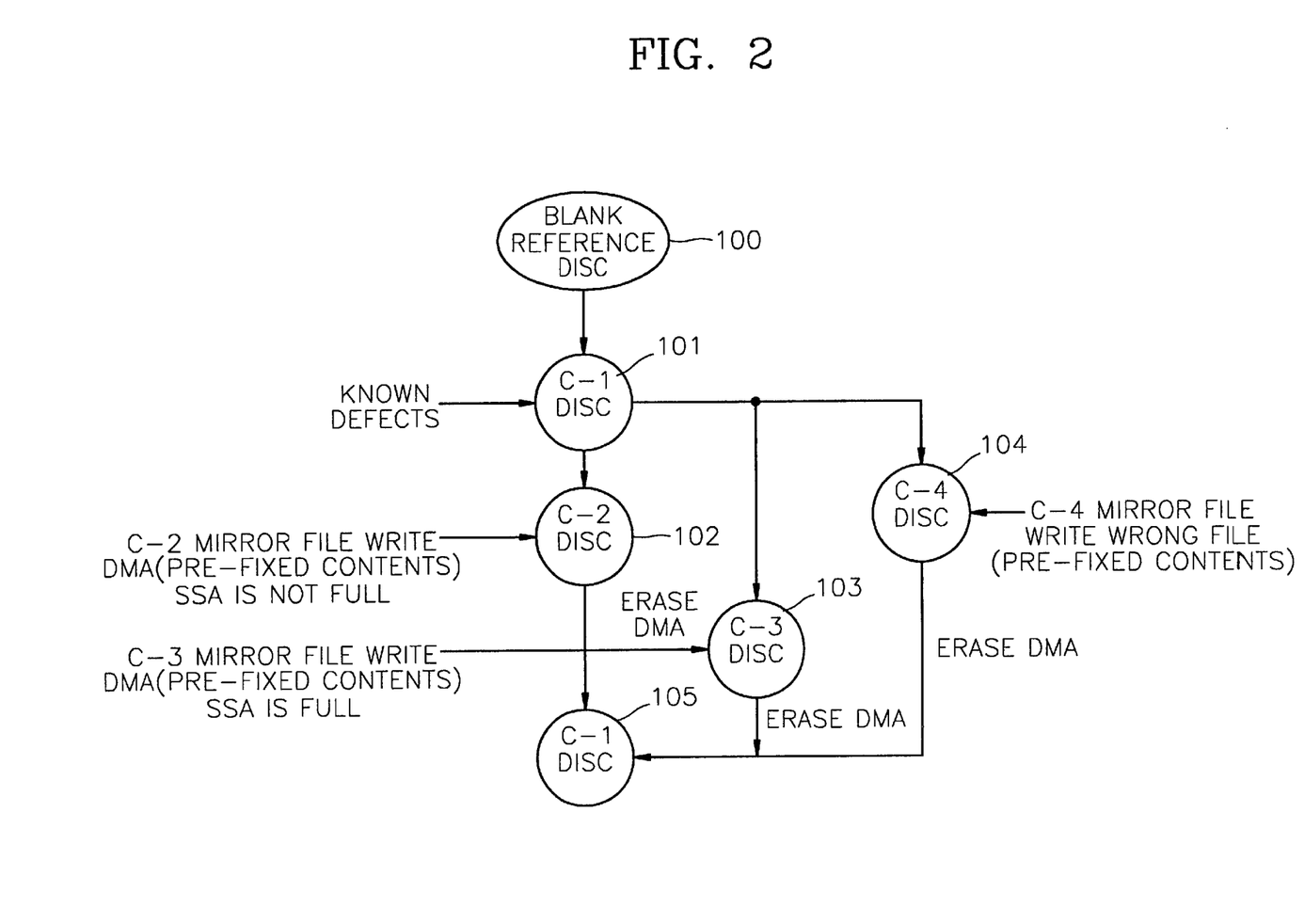
FIG. 2 shows the states of test discs used in the test apparatus of FIG. 1.

FIG. 2 shows the state of the test disc which is used in the test apparatus of FIG. 1. Known physical defects are made on a blank reference disc 100, thereby producing a C-1 disc 101. Different methods may be used for making the known physical defects on the blank reference disc 100. One example is making erroneous PID on a stamper which is used for disc production. A C-2 mirror file is written to the C-1 disc 101, thereby producing the C-2 disc 102. A C-3 mirror file is written to the C-1 disc 101, thereby producing the C-3 disc 103. A C-4 mirror file is written to the C-1 disc 101, thereby producing the C-4 disc 104. The C-2 disc 102, the C-3 disc 103 and the C-4 disc 104, from which DMA information is erased, become a C-1 disc 105.

The C-2 mirror file has the pre-fixed contents of the DMA which are written to a disc regardless of the defective state of the disc on which the C-2 mirror file will be recorded, and the SSA is not full. The C-3 mirror file has the pre-fixed contents of the DMA which are written to a disc regardless of the defective state of the disc on which the C-3 mirror file will be recorded, and the SSA is full. The C-4 mirror file has the start sector number of each zone among the pre-fixed contents of the DMA written wrongly to a disc on purpose, regardless of the defective state of the disc on which the C-4 mirror file will be recorded.

A test disc is produced using a mirror file because it is difficult to make a large number of defects (for example, several thousand defects) at predetermined positions. In addition, since defects may occur at undesirable positions even if defects are made at the predetermined positions, a problem that defect information varies with the physical characteristics of a disc may occur when a DMA is formed on the disc through a normal process. Particularly, in the case where the DMA information written to the C-2 disc is updated by reinitialization after use of the C-2 disc, the C-2 disc cannot be used as a test disc again. However, if standardized DMA contents and a modified drive which can record the contents are prepared, a disc with the same conditions can be reproduced at any time. For this reason, the test disc is made using a mirror file.

Figure 3:
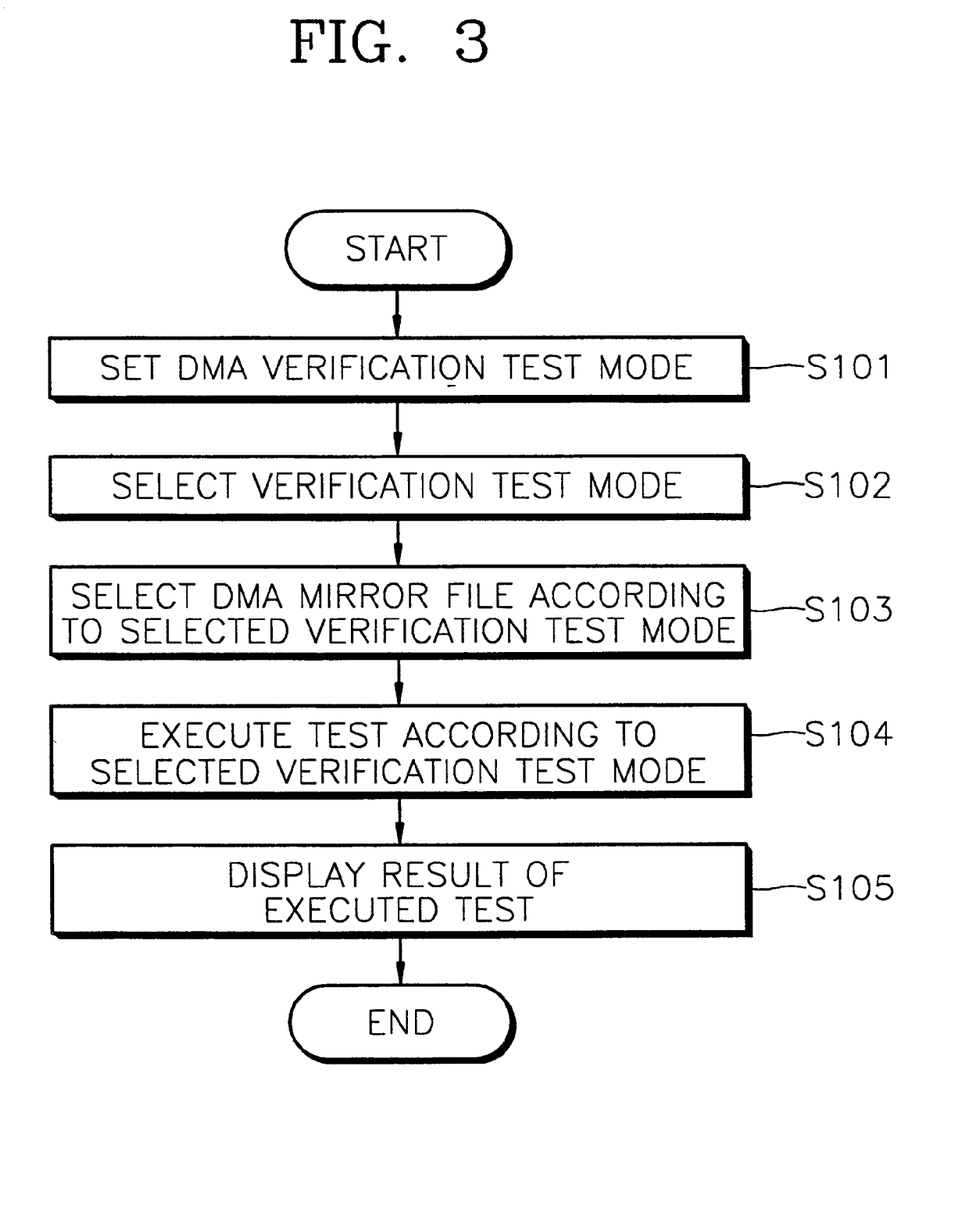
FIG. 3 is a flowchart of a method of verifying DMA information of an optical disc according to an embodiment of the present invention.

FIG. 3 is a flowchart of a method of verifying DMA information of an optical disc according to an embodiment of the present invention. A DMA verification test mode is set using a verification menu or key in step S101. When the DMA verification test mode is set, one of the displayed verification test modes (a first verification test mode: initialization with certification and initialization without certification, a second verification test mode: reinitialization with certification, reinitialization with list conversion and reinitialization with clearing a defect list, a third verification test mode for verifying the expansion of the SSA, and a fourth verification test mode for verifying that recording is performed based on wrong DMA information) is selected in step S102. A DMA mirror file is selected according to the selected verification test mode in step S103.

In step S104, the selected verification test mode is executed using the selected DMA mirror file. When initialization without certification is selected as the verification test mode, it is checked whether the result of the test performed by the test apparatus of FIG. 1 using the C-1 disc complies with a predetermined DMA structure, and the start logical sector number of each zone is also checked. When initialization with certification is selected as the verification test mode, it is checked whether the result of the test performed by the test apparatus of FIG. 1 using the C-1 disc complies with a predetermined DMA structure, and a list of the known defects of the C-1 disc and the start logical sector number of each zone are also checked. When reinitialization with certification is selected as the verification test mode, it is checked whether the result of the test performed by the test apparatus of FIG. 1 using the C-2 disc complies with a predetermined DMA structure, and it is checked whether the P list is maintained. In addition, a list of the known defects of the disc (which are the same as the intentional defects of the C-1 disc) and the start logical sector number of each zone are also checked. When reinitialization with list conversion is selected as the verification test mode, it is checked whether the result of the test performed by the test apparatus of FIG. 1 using the C-2 disc complies with a predetermined DMA structure, and it is checked whether the P and G1 lists are maintained. In addition, PDL and SDL for the list conversion and the start logical sector number of each zone are also checked. When reinitialization with clearing is selected as the verification test mode, it is checked whether the result of the test performed by the test apparatus of FIG. 1 using the C-2 disc complies with a predetermined DMA structure, it is checked whether the P and G1 lists are maintained, and it is checked whether the G2 list and SDL are erased. The start logical sector number of each zone is also checked. In the third verification test mode for verifying the expansion of the SSA, it is checked whether the result of the test performed by the test apparatus of FIG. 1 using the C-3 disc complies with a predetermined DMA structure. In addition, it is checked whether the result of the test complies with a predetermined file system, using a file system verifier. In the fourth verification test mode for testing start logical sector numbers, it is checked by the test apparatus of FIG. 1 using the C-4 disc whether wrong start logical sector numbers are sorted, and it is checked whether user data is not written to the disc.

Thereafter, the result of the selected verification test mode is displayed in step S105. Although not shown in FIG. 3, the process of returning to the step S102 to select another verification mode and performing the steps S103 through S105 may be repeated until an end mode is set.

Figure 4:
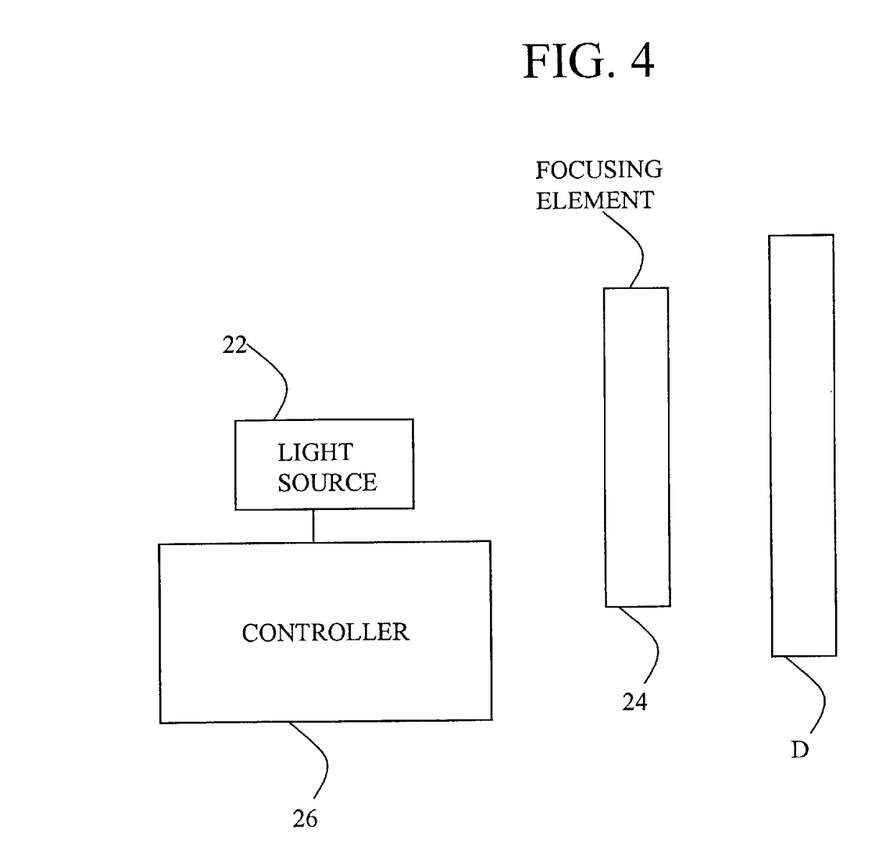
FIG. 4 is a block diagram of a drive to be tested shown in FIG. 1.

FIG. 4 shows the drive to be tested 20 having a light source 22 to emit light, a focusing element 24 to focus the light emitted from the light source 22 on a disc D, and a controller 26 which controls the light source 22. The verification process described above seeks to verify the proper operation of the controller 26.

As described above, the present invention easily verifies that a recording and reproducing apparatus properly translates and processes defect information and simply implements a test apparatus with low cost by using a different test disc, which is made using a mirror file with pre-fixed defect information which is not related to actual defects on a disc, depending on a test type.

Although a few embodiments of the present invention have been shown and described, it would be appreciated by those skilled in the art that changes may be made in these embodiments without departing from the principles and spirit of the invention, the scope of which is defined in the claims and their equivalents

What is claimed is:

1. A method of verifying whether defect management area (DMA) information is properly generated or updated in a recording and reproducing apparatus which records or reproduces information on or from an optical disc with the DMA information, the method comprising:
    selecting one among a plurality of test modes for verifying the DMA information and setting a test reference according to the selected verification test mode;
    generating test information from the DMA information, which is generated or updated by the recording and reproducing apparatus, according to the selected verification test mode; and
    executing a test for verifying the test information using the test reference in the selected verification test mode.

2. The method of claim 1, wherein the test information is a DMA mirror file.

3. The method of claim 1, wherein the test information is directly read from a DMA area on a disc used for a test.

4. The method of claim 1, further comprising displaying a result of the executed test.

5. The method of claim 1, wherein the plurality of test modes for verifying the DMA information are a first verification test mode for testing the generation of the DMA information depending upon initialization with certification or initialization without certification of the optical disc, a second verification test mode for testing the generation or updating of the DMA information depending upon reinitialization with certification, reinitialization with list conversion or reinitialization with clearing a defect list of the optical disc, a third verification test mode for verifying expansion of a supplementary spare area of the optical disc, and a fourth verification test mode for verifying that recording on the optical disc is performed based on wrong DMA information.

6. The method of claim 5, wherein the generating of the test information comprises recording pre-fixed contents of a DMA and selecting a first mirror file, in which the supplementary spare area is not full, in response to the selected verification test mode being the second verification mode, recording the pre-fixed contents of the DMA and selecting a second mirror file, in which the supplementary spare area is full, in response to the selected verification test mode being the third verification mode, and selecting a third mirror file, in which a start sector number of each zone among the pre-fixed contents of the DMA is written wrongly on purpose, in response to the selected verification test mode being the fourth verification mode.

7. The method of claim 5, further comprising:
    obtaining a first test disc by forming known physical defects on a blank disc and using the first test disc in generating the test information in the first verification test mode.

8. The method of claim 7, wherein the executing of the test comprises performing initialization without certification, checking whether the DMA information of the first test disc complies with a predetermined DMA structure, and checking a start logical sector number of each zone of the first test disc, in the first verification test mode.

9. The method of claim 7, wherein the executing of the test comprises performing initialization with certification, checking whether the DMA information of the first test disc complies with a predetermined DMA structure, checking a list of the known defects of the first test disc, and checking a start logical sector number of each zone, in the first verification test mode.

10. The method of claim 7, further comprising obtaining a second test disc by recording pre-fixed contents of a DMA in the first test disc, and recording a first mirror file indicating that the supplementary spare area is not full in the first test disc, and using the second test disc in generating the test information in the second verification test mode.

11. The method of claim 10, wherein the executing of the test comprises performing reinitialization with certification, checking whether the DMA information of the second test disc complies with a predetermined DMA structure, checking whether a P-list is maintained, checking a list of defects which are the same as the known defects of the first test disc, and checking the start logical sector number of each zone of the second test disc, in the second verification test mode.

12. The method of claim 10, wherein the executing of the test comprises performing reinitialization with list conversion, and checking whether the DMA information of the second test disc complies with a predetermined DMA structure, checking whether a P-list and a G1-list are maintained, checking a primary defect list (PDL) and a secondary defect list (SDL) for the list conversion, and checking a start logical sector number of each zone of the second test disc, in the second verification test mode.

13. The method of claim 12, wherein the generating of test information further comprises preparing sufficient SDL entries to test an overflow state during the list conversion, in the second verification test mode.

14. The method of claim 10, wherein the executing of the test comprises performing reinitialization with clearing, checking whether the DMA information of the second test disc complies with a predetermined DMA structure, checking whether a P-list and a G1-list are maintained, checking whether a G2-list and a secondary defect list (SDL) are cleared, and checking a start logical sector number of each zone of the second test disc, in the second verification test mode.

15. The method of claim 7, further comprising obtaining a third test disc by recording pre-fixed contents of a DMA in the first test disc, and recording a second mirror file having sufficient secondary defect list (SDL) defects to fill the supplementary spare area, and using the third test disc in generating the test information in the third verification test mode.

16. The method of claim 15, wherein the executing of the test comprises checking whether the DMA information of the third test disc complies with a predetermined DMA structure when the selected verification test mode is the third verification test mode.

17. The method of claim 16, wherein the executing of the test further comprises checking whether the DMA information of the third test disc complies with a file system.

18. The method of claim 7, further comprising obtaining a fourth test disc by recording a third mirror file, in which a start sector number of each zone among pre-fixed contents of a DMA is written wrongly on purpose, in the first test disc, is used in the fourth verification test mode.

19. The method of claim 18, wherein the executing of the test comprises checking whether the wrong start logical sector numbers on the fourth test disc are sorted out, checking whether user data is not written to the fourth test disc, and checking whether data is read based on the DMA information recorded in advance, in the fourth verification test mode.

20. A method of verifying whether defect management area (DMA) information is properly generated or updated in a recording and reproducing apparatus which records or reproduces information on or from an optical disc with the DMA information, the method comprising:
   generating test information from the DMA information, which is generated or updated by the recording and reproducing apparatus, according to a predetermined DMA verification test mode; and
   verifying the test information using a test reference for verifying the DMA information.

21. The method of claim 20, wherein the test information is a DMA mirror file.

22. The method of claim 20, wherein the generating of the test information comprises directly reading the test information from a DMA area on a disc used for generating the test information.

23. The method of claim 20, further comprising displaying a result of the verification.

24. The method of claim 20, wherein the predetermined DMA verification test mode is one among a first verification test mode for testing the generation of the DMA information depending upon initialization with certification or initialization without certification, a second verification test mode for testing the generation or updating of the DMA information depending upon reinitialization with certification, reinitialization with list conversion or reinitialization with clearing a defect list, a third verification test mode for verifying expansion of a supplementary spare area, and a fourth verification test mode for verifying that recording is performed based on wrong DMA information.

25. An apparatus for testing a recording and reproducing apparatus which records or reproduces information on or from a recordable and reproducible optical disc with defect management area (DMA) information to check whether the DMA information is properly generated or updated, the apparatus comprising:
   a modified drive unit generating test information from the generated or updated DMA information of a test disc, which is obtained after the recording and reproducing apparatus processes the test disc with a DMA mirror file corresponding to a selected mode among a plurality of DMA information verification test modes for verifying the DMA information in the selected mode; and
   a verifier comparing the test information with predetermined test information of the selected mode to verify a test result.

26. The apparatus of claim 25, wherein the test information is a DMA mirror file.

27. The apparatus of claim 25, wherein the modified drive unit reads the test information from a DMA area on the test disc and provides the test information to the verifier.

28. The apparatus of claim 25, wherein the plurality of test modes for verifying DMA information are a first verification test mode for testing the generation of the DMA information depending upon initialization with certification or initialization without certification, a second verification test mode for testing the generation or updating of the DMA information depending upon reinitialization with certification, reinitialization with list conversion or reinitialization with clearing a defect list, a third verification test mode for verifying expansion of a supplementary spare area, and a fourth verification test mode for verifying that recording is performed based on wrong DMA information.

29. The apparatus of claim 28, wherein the test disc is a first test disc on which known physical defects are formed on a blank disc, in the first verification test mode.

30. The apparatus of claim 29, wherein the verifier checks whether the DMA information generated on the first test disc complies with a predetermined DMA structure and checks the start logical sector number of each zone of the first test disc, in response to the selected verification test mode being the first verification test mode in which initialization without certification is performed.

31. The apparatus of claim 29, wherein the verifier checks whether the DMA information of the first test disc complies with a predetermined DMA structure and checks a list of the known defects and the start logical sector number of each zone of the first test disc, in response to the selected verification test mode being the first verification test mode in which initialization with certification is performed.

32. The apparatus of claim 29, wherein the test disc is a second test disc on which pre-fixed contents of a DMA are recorded in the first test disc, and on which a first mirror file that the supplementary spare area is not full is recorded, in the second verification test mode.

33. The apparatus of claim 32, wherein the verifier checks whether the DMA information of the second test disc complies with a predetermined DMA structure and whether a P-list is maintained, and checks a list of defects which are the same as the known defects and the start logical sector number of each zone of the second test disc, in response to the selected verification test mode being the second verification test mode in which reinitialization with certification is performed.

34. The apparatus of claim 32, wherein the verifier checks whether the DMA information of the second test disc complies with a predetermined DMA structure and whether a P-list and a G1-list are maintained, and checks a primary defect list (PDL) and a secondary defect list (SDL) for the list conversion and a start logical sector number of each zone of the second test disc, in response to the selected verification test mode being the second verification test mode in which reinitialization with list conversion is performed.

35. The apparatus of claim 34, wherein the second test disc has sufficient SOL entries to test an overflow state during the list conversion.

36. The apparatus of claim 32, wherein the verifier checks whether the DMA information of the second test disc complies with a predetermined DMA structure, whether a P-list and a G1-list are maintained, and whether a G2-list and a secondary defect list (SDL) are cleared, and checks a start logical sector number of each zone of the second test drive, in response to the selected verification test mode being the second verification test mode in which reinitialization with clearing is performed.

37. The apparatus of claim 29, wherein the test disc is a third test disc on which pre-fixed contents of DMA in the first test disc, and on which a second mirror file having sufficient secondary defect list (SDL) defects to fill the supplementary spare area is recorded, in the third verification test mode.

38. The apparatus of claim 37, wherein the verifier checks whether the DMA information of the third test disc complies with a predetermined DMA structure in response to the selected verification test mode being the third verification test mode.

39. The apparatus of claim 38, wherein the third test disc further has file system information, the apparatus further comprising a file system verifier checking whether the file system information on the third test disc complies with a predetermined file system in response to the selected verification test mode being the third verification test mode.

40. The apparatus of claim 29, wherein the test disc is a fourth test disc on which a third mirror file, in which a start sector number of each zone among pre-fixed contents of a DMA is written wrongly on purpose, is recorded on the first test disc, in the fourth verification test mode.

41. The apparatus of claim 40, wherein, in response to the selected verification test mode being the fourth verification test mode, the modified drive unit does not read the DMA information of the fourth test disc as a mirror file, and the verifier checks whether the wrong start logical sector numbers on the fourth test disc are sorted out, whether user data is not written to the fourth test disc, and whether data is read based on the recorded DMA information.

42. A method of verifying whether a recording and reproducing apparatus reads and processes defect management area (DMA) information properly, comprising:
    using a test disc containing predetermined defect information which does not have any relation with actual defects on the test disc and the reproducing and recording apparatus to generate test, information; and
    comparing the test information with reference test information to determine a verification of the recording and reproducing apparatus.

43. The method of claim 42, wherein:
    the using a test disc comprises:
    making known physical defects at predetermined positions in a blank disc, to produce the test disc, having the recording and reproducing apparatus process the test disc, to generate a disc with the DMA information, and reading only the DMA information from the disc with the DMA information using a reference drive, to generate a DMA mirror file as the test information;
    wherein the reference test information is a reference DMA mirror file.

44. The method of claim 42, wherein the generating of the test information and the comparing of the test information with the reference test information are in accordance with a verification test mode for testing the generation of the DMA information.

45. The method of claim 42, wherein the generating of the test information and the comparing of the test information are in accordance with one of a plurality of test modes, wherein the plurality of test modes are a first verification test mode for testing the generation of the DMA information depending upon initialization with certification or initialization without certification of the optical disc, a second verification test mode for testing the generation or updating of the DMA information depending upon reinitialization with certification, reinitialization with list conversion or reinitialization with clearing a defect list of the test disc, a third verification test mode for verifying expansion of a supplementary spare area of the test disc, and a fourth verification test mode for verifying that recording on the test disc is performed based on wrong DMA information.

46. The method of claim 45, wherein the generating of the test information comprises recording pre-fixed contents of a DMA and selecting a first mirror file, in which the supplementary spare area is not full, in response to the one verification test mode being the second verification mode, recording the pre-fixed contents of the DMA and selecting a second mirror file, in which the supplementary spare area is full, in response to the one verification test mode being the third verification mode, and selecting a third mirror file, in which a start sector number of each zone among the pre-fixed contents of the DMA is written wrongly on purpose, in response to the one verification test mode being the fourth verification mode.

47. The method of claim 45, wherein, in the first verification test mode, the using of the test disc, comprises:
    making known physical defects at predetermined positions in a blank disc, to produce the test disc as a first test disc, having the recording and reproducing apparatus process the first test disc, to generate a first test disc with the DMA information, and reading only the DMA information from the first test disc with the DMA information using a reference drive, to generate a first test DMA mirror file as the test information;
    wherein the reference test information is a first reference DMA mirror file.

48. The method of claim 47, wherein the comparing comprises performing initialization without certification, checking whether the DMA information of the first test disc complies with a predetermined DMA structure, and checking a start logical sector number of each zone of the first test disc, in the first verification test mode.

49. The method of claim 47, wherein the comparing comprises performing initialization with certification, checking whether the DMA information of the first test disc complies with a predetermined DMA structure, checking a list of the known defects of the first test disc, and checking a start logical sector number of each zone, in the first verification test mode.

50. The method of claim 47, wherein, in the second verification test mode, the using of the test disc, comprises:
    obtaining a second test disc by recording pre-fixed contents of a DMA in the first test disc, and recording a second mirror file indicating that the supplementary spare area is not full in the first test disc;
    having the recording and reproducing apparatus process the second test disc, to generate a second test disc with the DMA information, and reading only the DMA information from the second test disc with the DMA information using the reference drive, to generate a second test DMA mirror file as the test information;

wherein the reference test information is a second reference DMA mirror file.

51. The method of claim 50, wherein the comparing comprises performing reinitialization with certification, checking whether the DMA information of the second test disc complies with a predetermined DMA structure, checking whether a P-list is maintained, checking a list of defects which are the same as the known defects of the first test disc, and checking the start logical sector number of each zone of the second test disc, in the second verification test mode.

52. The method of claim 50, wherein the comparing comprises performing reinitialization with list conversion, and checking whether the DMA information of the second test disc complies with a predetermined DMA structure, checking whether a P-list and a G1-list are maintained, checking a primary defect list (PDL) and a secondary defect list (SDL) for the list conversion, and checking a start logical sector number of each zone of the second test disc, in the second verification test mode.

53. The method of claim 52, wherein the generating of the test information further comprises preparing sufficient SOL entries to test an overflow state during the list conversion, in the second verification test mode.

54. The method of claim 50, wherein the comparing comprises performing reinitialization with clearing, checking whether the DMA information of the second test disc complies with a predetermined DMA structure, checking whether a P-list and a G1-list are maintained, checking whether a G2-list and a secondary defect list (SDL) are cleared, and checking a start logical sector number of each zone of the second test disc, in the second verification test mode.

55. The method of claim 47, wherein, in the third verification test mode, the using of the test disc, comprises:
obtaining a third test disc by recording pre-fixed contents of a DMA in the first test disc, and recording a third mirror file having sufficient secondary defect list (SDL) defects to fill the supplementary spare area;
having the recording and reproducing apparatus process the third test disc, to generate a third test disc with the DMA information, and reading only the DMA information from the third test disc with the DMA information using the reference drive, to generate a third test DMA mirror file as the test information;
wherein the reference test information is a third reference DMA mirror file.

56. The method of claim 55, wherein the comparing comprises checking whether the DMA information of the third test disc complies with a predetermined DMA structure when the one verification test mode is the third verification test mode.

57. The method of claim 56, wherein the comparing further comprises checking whether the DMA information of the third test disc complies with a file system.

58. The method of claim 47, wherein, in the fourth verification test mode, the using of the test disc, comprises:
obtaining a fourth test disc by recording a fourth mirror file, in which a start sector number of each zone among pre-fixed contents of a DMA is written wrongly on purpose, in the first test disc;
having the recording and reproducing apparatus process the fourth test disc, to generate a fourth test disc with the DMA information, and reading only the DMA information from the fourth test disc with the DMA information using the reference drive, to generate a fourth test DMA mirror file as the test information;

wherein the reference test information is a fourth reference DMA mirror file.

59. The method of claim 58, wherein the comparing comprises checking whether the wrong start logical sector numbers on the fourth test disc are sorted out, checking whether user data is not written to the fourth test disc, and checking whether data is read based on the DMA information recorded in advance, in the fourth verification test mode.

60. The method of claim 42, further comprising:
adding additional defect data to the test disc to form a second test disc;
using the second test disc and the recording and reproducing apparatus to generate second test information; and
comparing the second test information with second reference test information to determine a second verification of the recording and reproducing apparatus.

61. The method of claim 60, wherein:
the adding comprises adding a reference DMA mirror file to the test disc to form the second disc; and
the comparing of the second test information comprises comparing the second test information with the reference DMA mirror file.

62. The method of claim 43, further comprising:
adding a second reference DMA mirror file to the test disc to form a second test disc;
having the recording and reproducing apparatus process the second test disc, to generate another test disc with additional DMA information; and
reading only the additional DMA information from the another test disc, to generate another DMA mirror file as the test information; and
comparing the second reference DMA mirror file to the second reference test DMA mirror file to determine a second verification of the recording and reproducing apparatus.

63. The method of claim 60, wherein:
the adding comprises adding a reference DMA mirror file to the test disc to form the second disc; and
the comparing of the second test information comprises comparing the second test information with the reference DMA mirror file.

64. The method of claim 53, wherein a number of the SDL entries prepared satisfies m+n*16>7679, before the reinitialization, where m represents a number of old PDL entries and n represents a number of old SDL entries.

65. The method of claim 50, wherein defects are concentrated before and after a position, which is most proper to determine whether the positions of a start logical sector number and a first logical sector number, which are determined depending on the positions and the number of defects on the second test disc, are exact.

66. The method of claim 50, wherein defects are disposed on the second test disc such that start and last sectors of each zone of the second test disc are processed as defects by the recording and reproducing apparatus.

67. The method of claim 55, wherein the third mirror file has spare area full flags, one for a primary spare area and the other for the supplementary spare area, embedded in the SDL and correspond to state in which the supplementary spare area is full, such that after the expansion of the supplementary spare area, the spare area full flag for the primary spare area is maintained, and the spare area full flag for the supplementary spare area is converted to indicate that the supplementary spare area is not full.

68. A method of verifying whether a recording and reproducing apparatus properly translates and processes defect information, the method comprising:

preparing a test disc using a defect management area (DMA) mirror file with pre-fixed defect information unrelated to actual defects on the test disc;

generating test information based on having the recording and reproducing apparatus process the test disc; and conducting a verification test on the test information.

69. The method of claim 68, wherein:

the generating of the test information comprises generating a test DMA mirror file from the test disc; and the conducting the verification test comprises comparing the test DMA mirror file with a reference DMA mirror file.

70. A method of verifying whether a recording and reproducing apparatus reads and processes defect management area (DMA) information properly, comprising:

processing a test disc containing predetermined defect information which does not have any relation with actual defects on the test disc using the reproducing and recording apparatus to generate the DMA information;

generating test information from the generated DMA information; and comparing the test information with reference test information to determine a verification of the recording and reproducing apparatus.

71. DMA information which is properly generated by a recording and reproducing apparatus using the process of:

processing a test disc containing predetermined defect information which does not have any relation with actual defects on the test disc using the reproducing and recording apparatus to generate the DMA information;

generating test information from the generated DMA information; and comparing the test information with reference test information to determine a verification of the recording and reproducing apparatus.

72. A recording and reproducing apparatus verified according to the process of:

processing a test disc containing predetermined defect information which does not have any relation with actual defects on the test disc using the reproducing and recording apparatus to generate DMA information;

generating test information from the generated DMA information; and comparing the test information with reference test information to determine a verification of the recording and reproducing apparatus.

73. A recording and reproducing apparatus verified according to the process of:

using a test disc containing predetermined defect information which does not have any relation with actual defects on the test disc and the reproducing and recording apparatus to generate test information; and comparing the test information with reference test information to determine a verification of the recording and reproducing apparatus.

74. An apparatus for testing a recording and reproducing apparatus which records or reproduces information on or from a recordable and reproducible optical disc with defect management area information to check whether DMA information is properly generated, the apparatus comprising:

a modified driver generating test information based on the DMA information of a test disc generated by a reproducing device processing the test disc with predetermined defect information which does not have any relation with actual defects on the test disc; and a verifier comparing the test information with reference test information to determine a verification of the recording and reproducing apparatus.

75. The apparatus of claim 74, wherein the modified driver reads only the DMA information from the test disc with the DMA information, to generate a DMA mirror file as the test information;

wherein the reference test information is a reference DMA mirror file.

76. The apparatus of claim 74, wherein the modified driver generates the test information and the verifier compares the test information with the reference test information in accordance with a verification test mode for testing the generation of the DMA information.

77. The apparatus of claim 74, wherein the modified driver generates the test information and the verifier compares the test information are in accordance with one of a plurality of test modes, wherein the plurality of test modes are a first verification test mode for testing the generation of the DMA information depending upon initialization with certification or initialization without certification of the optical disc, a second verification test mode for testing the generation or updating of the DMA information depending upon reinitialization with certification, reinitialization with list conversion or reinitialization with clearing a defect list of the test disc, a third verification test mode for verifying expansion of a supplementary spare area of the test disc, and a fourth verification test mode for verifying that recording on the test disc is performed based on wrong DMA information.

78. The apparatus of claim 77, wherein the generating of the test information comprises recording pre-fixed contents of a DMA and selecting a first mirror file, in which the supplementary spare area is not full, in response to the one verification test mode being the second verification mode, recording the pre-fixed contents of the DMA and selecting a second mirror file, in which the supplementary spare area is full, in response to the one verification test mode being the third verification mode, and selecting a third mirror file, in which a start sector number of each zone among the pre-fixed contents of the DMA is written wrongly on purpose, in response to the one verification test mode being the fourth verification mode.

79. The apparatus of claim 77, wherein, in the first verification test mode:

the recording and reproducing apparatus processes the first test disc, to generate a first test disc with the DMA information, and the modified driver reads only the DMA information from the first test disc with the DMA information, to generate a first test DMA mirror file as the test information;

wherein the reference test information is a first reference DMA mirror file.

80. The apparatus of claim 79, wherein the verifier performs initialization without certification, checks whether the DMA information of the first test disc complies with a predetermined DMA structure, and checks a start logical sector number of each zone of the first test disc, in the first verification test mode.

81. The apparatus of claim 79, wherein the verifier performs initialization with certification, checks whether the DMA information of the first test disc complies with a predetermined DMA structure, checks a list of the known defects of the first test disc, and checks a start logical sector number of each zone, in the first verification test mode.

82. The apparatus of claim 79, wherein, in the second verification test mode:
the modified driver generates a second test disc by recording pre-fixed contents of a DMA in the first test disc, and records a second mirror file indicating that the supplementary spare area is not full in the first test disc;
the recording and reproducing apparatus processes the second test disc, to generate a second test disc with the DMA information; and
the modified driver reads only the DMA information from the second test disc with the DMA information, to generate a second test DMA mirror file as the test information;
wherein the reference test information is a second reference DMA mirror file.

83. The apparatus of claim 82, wherein the drive to be tested performs reinitialization with certification, and the verifier checks whether the DMA information of the second test disc complies with a predetermined DMA structure, checks whether a P-list is maintained, checks a list of defects which are the same as the known defects of the first test disc, and checks the start logical sector number of each zone of the second test disc, in the second verification test mode.

84. The apparatus of claim 82, wherein the drive to be tested performs reinitialization with list conversion, and the verifier checks whether the DMA information of the second test disc complies with a predetermined DMA structure, checks whether a P-list and a G1-list are maintained, checks a primary defect list (PDL) and a secondary defect list (SOL) for the list conversion, and checks a start logical sector number of each zone of the second test disc, in the second verification test mode.

85. The apparatus of claim 84, wherein the modified driver prepares sufficient SDL entries on the second test disc to test an overflow state during the list conversion, in the second verification test mode.

86. The apparatus of claim 84, wherein the verifier performs reinitialization with clearing, checks whether the DMA information of the second test disc complies with a predetermined DMA structure, checks whether a P-list and a G1-list are maintained, checks whether a G2-list and a secondary defect list (SDL) are cleared, and checks a start logical sector number of each zone of the second test disc, in the second verification test mode.

87. The apparatus of claim 79, wherein, in the third verification test mode:
the modified driver generates a third test disc by recording pre-fixed contents of a DMA in the first test disc, and records a third mirror file having sufficient secondary defect list (SDL) defects to fill the supplementary spare area;
the recording and reproducing apparatus processes the third test disc, to generate a third test disc with the DMA information, and the modified driver reads only the DMA information from the third test disc with the DMA information, to generate a third test DMA mirror file as the test information;
wherein the reference test information is a third reference DMA mirror file.

88. The apparatus of claim 87, wherein the verifier checks whether the DMA information of the third test disc complies with a predetermined DMA structure when the one verification test mode is the third verification test mode.

89. The apparatus of claim 88, wherein the verifier checks whether the DMA information of the third test disc complies with a file system.

90. The apparatus of claim 79, wherein, in the fourth verification test mode:
the modified driver generates a fourth test disc by recording a fourth mirror file, in which a start sector number of each zone among pre-fixed contents of a DMA is written wrongly on purpose, in the first test disc;
the recording and reproducing apparatus processes the fourth test disc, to generate or not generate a fourth test disc with the DMA information;
wherein the verifier directly receives the fourth test disc with or without the DMA information from the recording and reproducing apparatus.

91. The apparatus of claim 90, wherein the verifier checks whether the wrong start logical sector numbers on the fourth test disc are sorted out, checks whether user data is not written to the fourth test disc, and checks whether data is read based on the DMA information recorded in advance, in the fourth verification test mode.

92. The apparatus of claim 74, wherein:
the modified driver adds additional defect data to the test disc to form a second test disc;
the recording and reproducing apparatus processes the second test disc to generate additional DMA information as second test information; and
the verifier compares the second test information with second reference test information to determine a second verification of the recording and reproducing apparatus.

93. The apparatus of claim 92, wherein:
the modified driver adds a reference DMA mirror file to the test disc to form the second disc; and
the verifier compares the second test information with the reference DMA mirror file.

94. The apparatus of claim 75, wherein:
the modified driver adds a second reference DMA mirror file to the test disc to form a second test disc;
the recording and reproducing apparatus processes the second test disc, to generate another test disc with additional DMA information; and
the modified driver reads only the additional DMA information from the another test disc, to generate another DMA mirror file as the test information; and
the verifier compares the second reference DMA mirror file to the second reference test DMA mirror file to determine a second verification of the recording and reproducing apparatus.

95. The apparatus of claim 92, wherein:
the modified driver adds a reference DMA mirror file to the test disc to form the second disc; and
the verifier compares the second test information with the reference DMA mirror file.

96. The apparatus of claim 85, wherein the modified driver prepares a number of the SOL entries which satisfies m+n*16>7679, before the reinitialization, where m represents a number of old PDL entries and n represents a number of old SDL entries.

97. The apparatus of claim 82, wherein the modified driver concentrates defects before and after a position, which is most proper to determine whether the positions of a start logical sector number and a first logical sector number, which are determined depending on the positions and the number of defects on the second test disc, are exact.

98. The apparatus of claim 82, wherein the modified driver disposes defects on the second test disc such that start and last sectors of each zone of the second test disc are processed as defects by the recording and reproducing apparatus.

99. The apparatus of claim 87, wherein the third mirror file has spare area full flags, one for a primary spare area and the other for the supplementary spare area, embedded in the SOL and correspond to state in which the supplementary spare area is full, such that after the expansion of the supplementary spare area, the spare area full flag for a primary spare area is maintained, and the spare area full flag for the supplementary spare area is converted to indicate that the supplementary spare area is not full.

100. The apparatus of claim 74, wherein the verifier receives the reference test information from an external source to make the comparison between the test information and the reference test information.

101. The apparatus of claim 94, wherein the verifier receives the second reference DMA file from an external source to make the comparison between the second reference DMA mirror file to the second reference test DMA mirror file.

102. The apparatus of claim 94, wherein the verifier stores the second reference DMA file to make the comparison between the second reference DMA mirror file to the second reference test DMA mirror file.

103. The apparatus of claim 78, wherein the verifier positively verifies the recording and reproducing apparatus if the recording and reproducing apparatus does not process the test disc by performing a recording operation of the DMA information on the test disc when the wrong logical sector number of each zone is written on the fourth test disc in the fourth verification mode.

104. A method of manufacturing a compliant recording and reproducing apparatus, comprising:

manufacturing an uncertified recording and reproducing apparatus that updates and generates defect management area (DMA) information; and verifying whether the uncertified recording and reproducing apparatus is compliant with a standard, said verifying comprising:

using a test disc containing predetermined defect information which does not have any relation with actual defects on the test disc and the reproducing and recording apparatus to generate test information, and comparing the test information with reference test information to determine a verification of the recording and reproducing apparatus, the verification indicating that the uncertified recording and reproducing apparatus is compliant with the standard.

105. A disc recording and reproducing apparatus for recording and reproducing information on an optical disc, comprising:

a light source to emit a light;

a focusing element to focus the light onto the optical disc to record and reproduce the information; and a controller to control said light source, said controller being verified to update and generate defect management area (DMA) information by using a test disc containing predetermined defect information which does not have any relation with actual defects on the test disc and the reproducing and recording apparatus to generate test information, and comparing the test information with reference test information to determine the verification of the recording and reproducing apparatus.

106. A disc recording and reproducing apparatus for recording and reproducing information on an optical disc:

a light source to emit a light;

a focusing element to focus the light onto the optical disc for recording and reproducing the information; and a controller to control said light source and to update and generate defect management area information compliant with a standard as verified according to the manufacturing method of claim 104.

* * * * *

UNITED STATES PATENT AND TRADEMARK OFFICE
CERTIFICATE OF CORRECTION

PATENT NO.    : 6,714,502 B2
DATED         : March 30, 2004
INVENTOR(S)   : Jung-wan Ko et al.

It is certified that error appears in the above-identified patent and that said Letters Patent is hereby corrected as shown below:

<u>Column 13,</u>
Line 55, after "test" delete ","
Line 62, after "disc", insert a new paragraph.
Line 65, before "reading", insert a new paragraph.

<u>Column 14,</u>
Line 39, after "disc" insert a new paragraph.
Line 41, after "and" insert a new paragraph.

<u>Column 15,</u>
Lines 1 and 45, after "and" insert a new paragraph.
Line 25, change "SOL" to -- SDL --.

<u>Column 18,</u>
Line 56, after "and" insert a new paragraph.

<u>Column 19,</u>
Line 35, change "SOL" to -- SDL --.
Line 60, after "and" insert a new paragraph.

<u>Column 20,</u>
Line 58, change "SOL" to -- SDL --.

<u>Column 21,</u>
Line 9, change "SOL" to -- SDL --.

UNITED STATES PATENT AND TRADEMARK OFFICE
CERTIFICATE OF CORRECTION

PATENT NO. : 6,714,502 B2
DATED : March 30, 2004
INVENTOR(S) : Jung-wan Ko et al.

It is certified that error appears in the above-identified patent and that said Letters Patent is hereby corrected as shown below:

<u>Column 22,</u>
Lines 7 and 26, after "and" insert a new paragraph.
Line 22, after "by" insert a new paragraph.

Signed and Sealed this

Twenty-ninth Day of June, 2004

JON W. DUDAS
*Acting Director of the United States Patent and Trademark Office*